United States Patent
Nagayama

[11] Patent Number: 5,823,729
[45] Date of Patent: Oct. 20, 1998

[54] TEE NUT AND METHOD OF MANUFACTURING THE SAME

[75] Inventor: Yutaka Nagayama, Osaka, Japan

[73] Assignee: Nagayama Electronic Industry Co., Ltd., Wakayama, Japan

[21] Appl. No.: 808,242

[22] Filed: Feb. 28, 1997

[30] Foreign Application Priority Data

Aug. 15, 1996 [JP] Japan .................................. 8-215665

[51] Int. Cl.⁶ .................................................. F16B 37/14
[52] U.S. Cl. .............................. 411/429; 411/82; 411/427
[58] Field of Search ................................. 411/427, 429, 411/171, 82, 910

[56] References Cited

U.S. PATENT DOCUMENTS

| | | | |
|---|---|---|---|
| 1,309,616 | 7/1919 | Eisler | 411/427 |
| 3,019,856 | 2/1962 | Rohe | 411/82 |
| 3,270,610 | 9/1966 | Knowlton | 411/427 |
| 3,392,225 | 7/1968 | Phelan . | |
| 3,457,824 | 7/1969 | Derby | 411/429 |
| 3,621,557 | 11/1971 | Cushman . | |
| 3,884,006 | 5/1975 | Dietlein | 411/82 |
| 4,822,223 | 4/1989 | Williams | 411/82 |
| 5,195,854 | 3/1993 | Nagayama . | |
| 5,238,344 | 8/1993 | Nagayama . | |
| 5,240,543 | 8/1993 | Fetterhoff | 411/82 |

FOREIGN PATENT DOCUMENTS

| | | |
|---|---|---|
| 4201016 | 11/1992 | Germany . |
| 4206821 | 1/1993 | Germany . |

*Primary Examiner*—Flemming Saether
*Attorney, Agent, or Firm*—W. F. Fasse; W. G. Fasse

[57] ABSTRACT

A tee nut includes a shaft part, a flange part outwardly extending from a first end of the shaft part, and a cap part outwardly extending on a second end of the shaft part while blocking or closing this second end, which consist of an integral material. The shaft part is in the form of a hollow cylinder, and is provided with a female screw threading on its inner peripheral surface, while the cap part has a non-circular external shape. The tee nut having this structure can be manufactured from a metal plate through a series of steps including plastic working, and can be securely embedded in and fixed to a member consisting of resin or rubber while preventing displacement of the tee nut.

7 Claims, 8 Drawing Sheets

TEE NUT AND METHOD OF MANUFACTURING THE SAME

BACKGROUND OF THE INVENTION

1. Field of the Invention

The present invention relates to a tee nut having a hollow shaft part provided with a female screw threading on its inner peripheral surface and a flange part outwardly extending from an end of the shaft part, and to a method of manufacturing the same. More particularly, the invention relates to a tee nut adapted to be embedded in and fixed to a component consisting of a resin material or rubber in molding thereof and a method of manufacturing the same.

2. Description of the Background Art

A conventional capped tee nut 1 related to the present invention is now described with reference to FIGS. 7A to 7C and 8A and 8B.

Figure 7A:
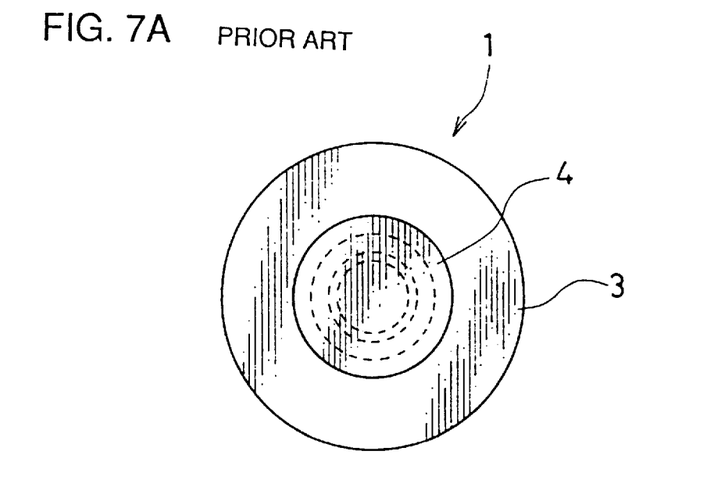
FIGS. 7A, 7B and 7C are a plan view, a central longitudinal sectional view and a perspective view showing a conventional capped tee nut respectively.
Figure 7B:
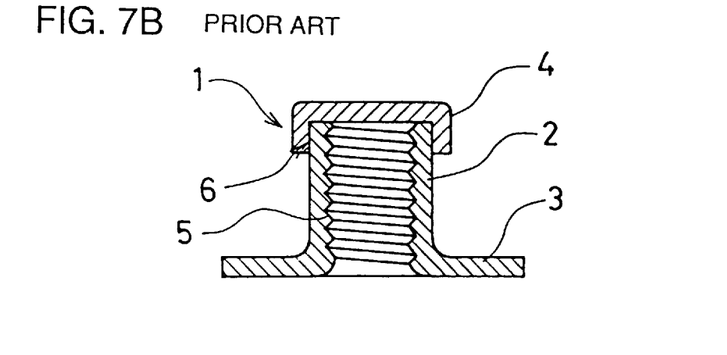
Figure 7C:
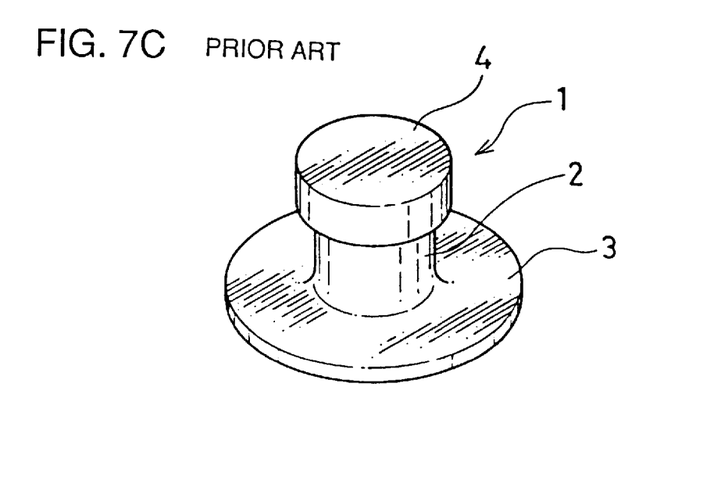

As shown in FIGS. 7A to 7C, the conventional tee nut 1 comprises a tee nut body part, consisting of an integral metal material, having a shaft part 2 and a flange part 3 outwardly extending from a first end of the shaft part 2. The tee nut 1 further comprises a cap part 4 engaging with a second end of the shaft part 2 opposite to the first end for blocking or closing the second end. The shaft part 2 is in the form of a hollow cylinder, which is provided with a female screw threading 5 on its inner peripheral surface. The female screw threading 5 is formed along the overall area of the inner peripheral surface of the shaft part 2.

Figure 8A:
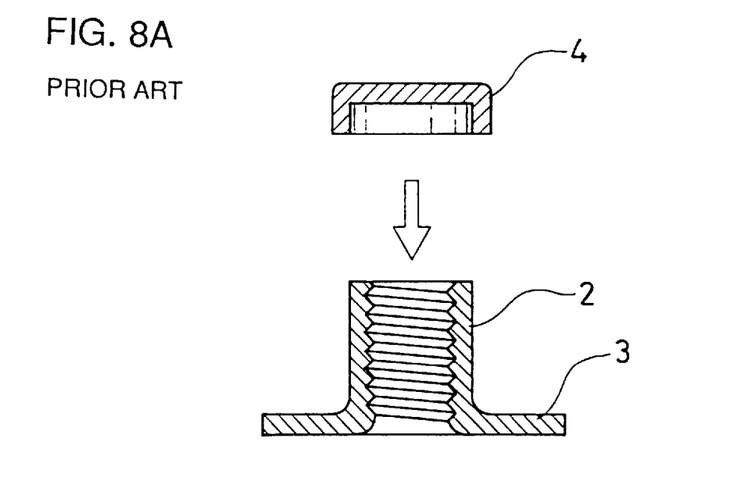
FIGS. 8A and 8B are sectional views showing a step of assembling the conventional capped tee nut shown in FIGS. 7A to 7C and the capped tee nut embedded in a resin member respectively.

Engaging surfaces 6 on the outer peripheral surface of the second end of the shaft part 2 and the inner peripheral surface of a cylindrical portion of the cap part 4 are connected with or fixed to each other by spot welding or caulking, for forming the integral tee nut 1 as a whole. In such a conventional tee nut 1, the tee nut body part including the shaft part 2 provided with the female screw threading 5 on its inner periphery and the flange part 3 is previously formed in one operation, and the cap part 4 is also previously formed in another operation. Then the cap part 4 is installed on the shaft part 2, from the side of the second end of the shaft part 2 as shown in FIG. 8A, whereupon the engaging surfaces 6 of these parts are connected with or fixed to each other by spot welding or caulking in this state.

Figure 8B:
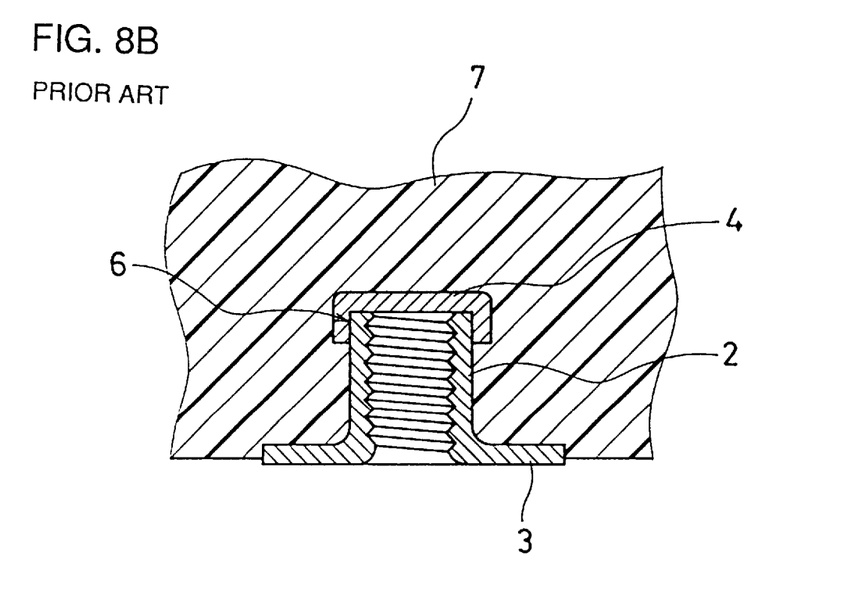

The capped tee nut 1 formed in the aforementioned manner is embedded in and fixed to a member 7 consisting of resin or rubber in such a state that the female screw threading 5 surface is open on the surface of the member 7, as shown in FIG. 8B. To achieve this, tee nut 1 is set on a prescribed position in a mold for molding the member 7 along with a melted resin material (or a melted rubber material), and the resin material is solidified so that the tee nut 1 is embedded in and fixed to the member 7. The tee nut 1 which is fixed to the member 7 in the aforementioned manner is prevented from displacement from the member 7 by the cap part 4 serving as a stop member, so that a screw member such as a bolt can be fitted with the female screw threading 5 provided on the inner peripheral surface of the shaft part 2.

If a slight clearance is defined between the engaging surfaces 6 on the outer peripheral surface of the second end of the shaft part 2 and the inner peripheral surface of the cylindrical portion of the cap part 4 in the aforementioned conventional capped tee nut 1, however, the melted resin material (or the melted rubber material) may disadvantageously flow into the portion of the female screw threading 5 through the clearance when the member 7 is molded.

Further, the cap part 4 has a cylindrical outer periphery, and hence the tee nut 1 may undesirably rotate as a result of the torque applied for fitting a male screw into the female screw threading 5 although displacement or removal of the tee nut 1 out of the member 7 can be prevented by the cap part 4.

In addition, the tee nut body part and the cap part 4 are formed by different members which are then to be connected with and fixed to each other through engagement, and hence spot welding or caulking must be performed on every tee nut 1. Thus, it is difficult to improve mass productivity, which is an extremely important characteristic of this type of product.

SUMMARY OF THE INVENTION

An object of the present invention is to provide a structure of a tee nut and a method of manufacturing the same, which make it possible to manufacture a tee nut in high mass productivity while providing a tee nut configuration preventing the tee nut from rotation in a state embedded in and fixed to a member consisting of resin or rubber.

In order to attain the aforementioned object, the inventive tee nut comprises a shaft part, a flange part radially outwardly extending from a first end of the shaft part, and a cap part radially outwardly extending on a second end of the shaft part opposite to the first end while blocking or closing the second end, which all consist of an integral metal material. The shaft part is in the form of a hollow cylinder and is provided with a female screw threading on its inner peripheral surface.

When the inventive tee nut having such a structure is embedded in a member consisting of a resin material or the like, the cap part can prevent the tee from being displaced out of or removed from the member. Further, the cap part consists of a material that is integral with a tee nut body part consisting of the shaft part and the flange part, whereby no clearance is defined between engaging portions on the inner periphery of the cap part and the outer periphery of the shaft part as it is in the prior art. Thus, no melted resin material or the like can flow from the second end into the female screw threading provided on the inner side of the shaft part during molding of the member for receiving the tee nut which is embedded in and fixed to the same.

As the shape of the cap part, an angular shape such as an octagonal shape, or a shape having projections on a cylindrical outer periphery can be employed, for example. By adopting a non-circular shape such as octagonal or the like as the shape of the cap part, the tee nut embedded in a member consisting a resin material or the like can be prevented from rotating with respect to the member.

The inventive tee nut having the aforementioned structure can be manufactured through the following steps. First, a metal plate is prepared, and the position of a portion for defining the flange part is decided. Thereafter a central part of the portion of the metal plate for defining the flange part is swollen toward one major surface of the metal plate, thereby forming a swollen portion for defining the shaft part. Then, the thickness of a forward end of the formed swollen portion corresponding to a portion for defining the cap part is reduced as compared with that of a base portion corresponding to a shaft portion to be provided with the female screw threading. Thereafter outer and inner diameters of the base portion are reduced while maintaining the thickness of the base portion substantially unchanged. Then, the forward end of the swollen portion having the reduced thickness is outwardly bent while its outer periphery is molded into a non-circular shape, thereby forming the non-circular cap part having a flat space in its interior. Thereafter the female screw threading is formed on the inner peripheral surface of the base portion of the swollen portion.

According to this manufacturing method, the cap part is formed by plastic working rather than by cutting, whereby molding or drawing can be executed through a series of steps including plastic working for forming the swollen portion for defining the shaft part in manufacturing of the tee nut. Therefore, neither spot welding nor caulking is required for connecting the tee nut body part with the cap part dissimilarly to the prior art, but instead an integral capped tee nut can be continuously and efficiently manufactured by drawing through a series of pressing steps in appropriate dies, for remarkably improving mass productivity.

In this manufacturing method, the steps of deciding the position of the portion for defining the flange part, forming the swollen portion, reducing the thickness of the forward end as compared with that of the base portion, reducing the outer and inner diameters of the base portion, forming a flange-type extension part on the forward end of the swollen portion, and forming the cap part can be executed while employing a long strip-shaped metal plate as the starting material and feeding the strip-shaped metal plate along progressive dies.

When the various types of steps for obtaining the tee nut are carried out while feeding the long strip-shaped metal plate along the progressive dies as described above, it is possible to form the portion having a reduced thickness for defining the cap part, and, then further extend this portion for forming the cap part as the strip-shaped metal plate progresses through the process. In this point, the tee nut can be further efficiently manufactured without requiring individual handling of disconnected intermediate products.

In a preferred embodiment of the present invention, the step of forming the cap part on the forward end of the swollen portion is carried out by constraining the inner periphery of the base portion of the swollen portion while opening or allowing expansion of the outer periphery of the swollen portion and pressing an end surface of the second end of the swollen portion toward the first end thereby deforming the forward end of the swollen portion to be bent outward.

Further, the step of forming the cap part is carried out by constraining the outwardly bent deformation of the forward end of the swollen portion with a molding die provided with a concave part having a non-circular cross section, thereby molding the cap part to have a non-circular outer periphery.

On the other hand, the step of reducing the thickness of the forward end as compared with the base portion is carried out by relatively reducing the outer diameter of the forward end of the swollen portion as compared with that of the base portion while regulating or restricting the reduction of the inner diameter along the overall length of the swollen portion, or by uniformly enlarging the inner diameter of the swollen portion while regulating or restricting the enlargement of the outer diameter of the forward end.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First to third embodiments of the structure of the tee nut according to the present invention are now described with reference to FIGS. 1A to 1C, 2A to 2C and 3A to 3B.

Figure 1A:
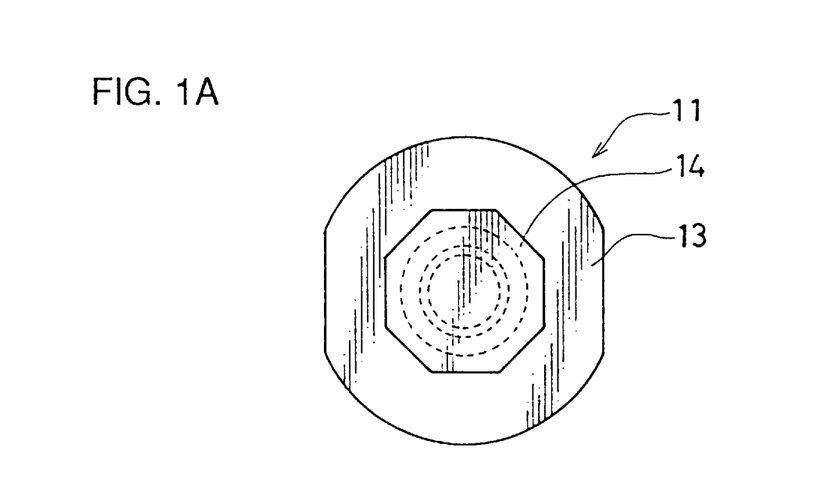
FIGS. 1A, 1B and 1C are a plan view, a central longitudinal sectional view and a perspective view showing a tee nut according to a first embodiment of the present invention respectively.
Figure 1B:
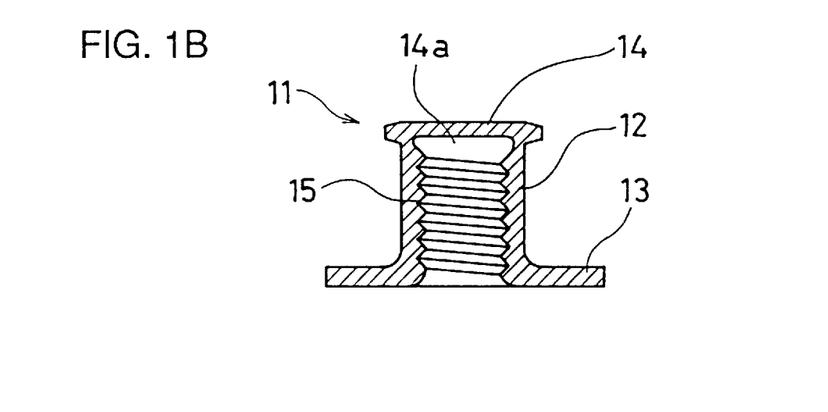
Figure 1C:
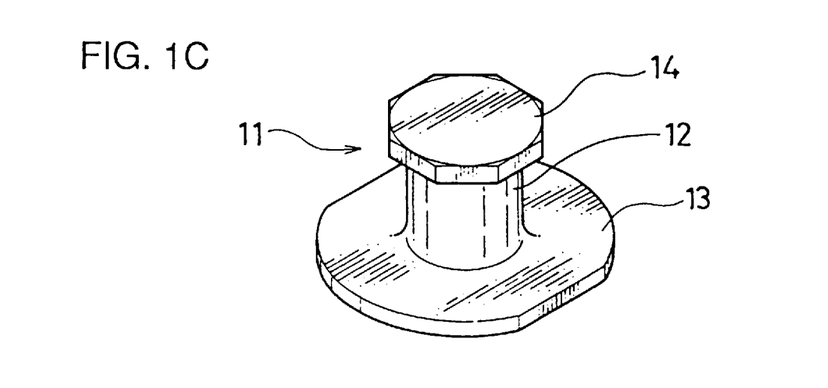

A tee nut 11 according to the first embodiment shown in FIGS. 1A to 1C comprises a shaft part 12 extending in an axial direction, a flange part 13 radially outwardly extending from a first end of the shaft part 12, and a cap part 14 radially outwardly extending from a second end of the shaft part 12 opposite to the first end while blocking or closing the second end, which all consist of an integral metal material. The shaft part 12 is in the form of a hollow cylinder, and is provided with a female screw threading 15 on its inner peripheral surface. The cap part 14 is so molded as to have an octagonal plane shape and include a flat space 14a having an outer diameter larger than the root diameter of the female threading screw 15. Due to the provision of such a space 14a, the female screw 15 can be formed substantially along the overall axial length of the shaft part 15.

The tee nut 11 according to this embodiment is adapted to be embedded in a member consisting of resin or rubber in a mode similar to that of the prior art tee nut 1 shown in FIG. 8B. The cap part 14 not only prevents the tee nut 11 from being displaced out of or removed from the resin or rubber member similarly to the prior art, but also prevents the tee nut 11 from undesirably rotating as a result of torque applied for fitting a male screw into the female screw threading 15 due to the octagonal plane shape of the cap part 14. The plane shape of the cap part 14 for serving such a function is not restricted to the octagonal shape, but another polygonal shape such as a quadrilateral or hexagonal shape is also employable, as a matter of course.

Figure 2A:
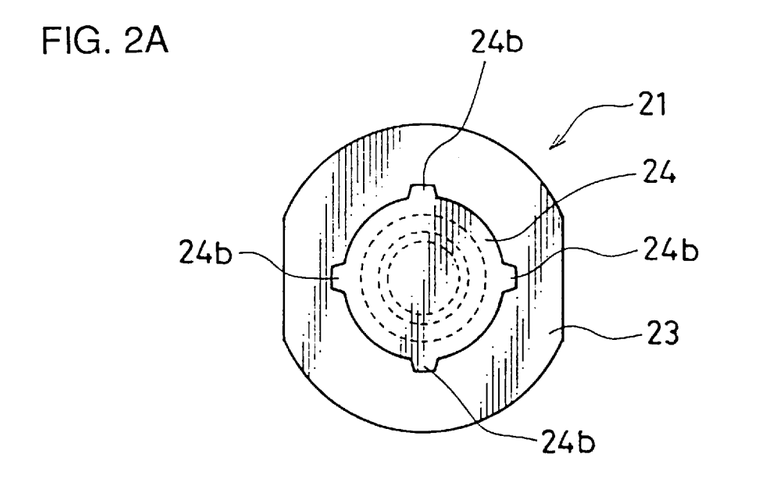
FIGS. 2A, 2B and 2C are a plan view, a central longitudinal sectional view and a perspective view showing a tee nut according to a second embodiment of the present invention respectively.
Figure 2B:
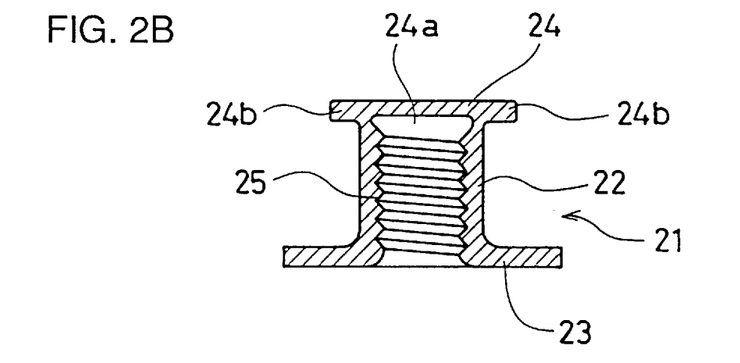
Figure 2C:
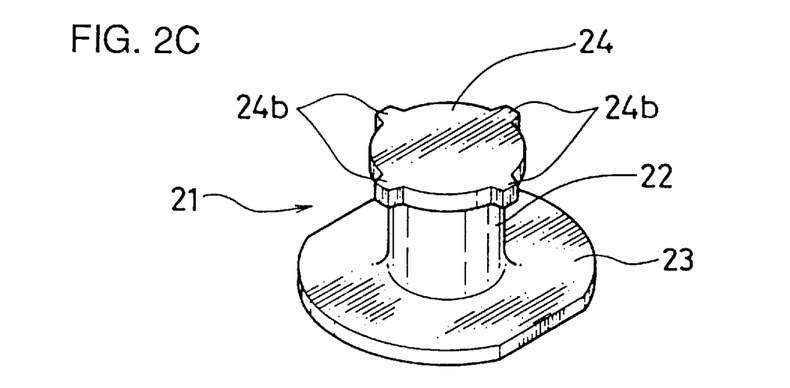

A tee nut 21 according to the second embodiment of the present invention shown in FIGS. 2A to 2C is similar to that of the first embodiment in that it comprises a shaft part 22 provided with a female screw threading 25 on its inner periphery, a flange part 23 outwardly extending from a first end of the shaft part 22, and a cap part 24 blocking or closing the shaft part 22 on its second end and including a flat space 24a having an outer diameter larger than the root diameter of the female screw threading 25 in its interior. The tee nut 21 is different from the tee nut 11 in that the cap part 24 does not have an angular shape but is provided with projections 24b at regular intervals on four portions of its cylindrical outer periphery. The tee nut 21 is also adapted to be embedded in a member consisting of resin or rubber in a mode similar to that of the prior art tee nut 1 shown in FIG. 8B. In this state, the projections 24b provided on the outer periphery of the cap part 24 serve as detents, thereby preventing unpreferable rotation of the tee nut 21 resulting from torque applied for fitting a male screw into the female screw threading 25. The shape and the number of the projections 24b for serving such a detent function are not restricted to those shown in FIGS. 2A to 2C but various modifications are employable, for example wherein such projections are provided on two portions to be opposed to each other at an angle of 180°, or on three portions at angles of 120°, for example.

Figure 3A:
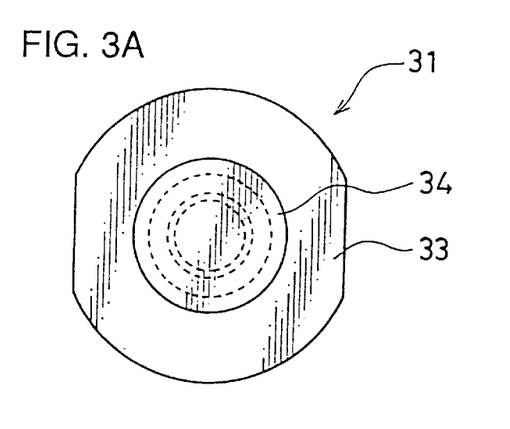
FIGS. 3A, 3B and 3C are a plan view, a central longitudinal sectional view and a perspective view showing a tee nut according to a third embodiment of the present invention respectively.
Figure 3B:
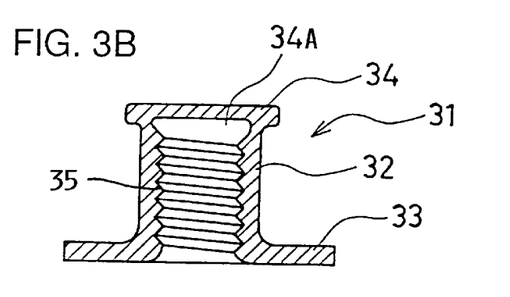
Figure 3C:
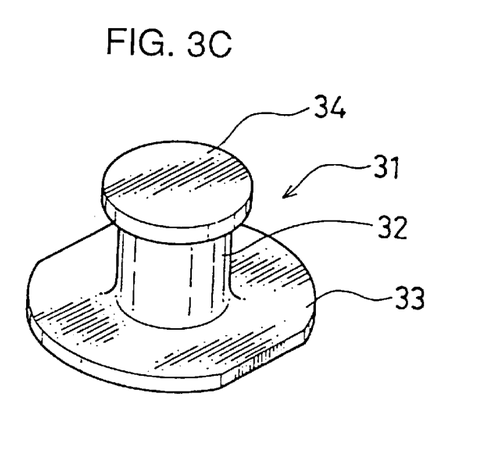

A tee nut 31 according to the third embodiment of the present invention shown in FIGS. 3A to 3C is similar to those of the first and second embodiments in that it comprises a shaft part 32 provided with a female screw threading 35 on its inner periphery, a flange part 33 outwardly extending from a first end of the shaft part 32, and a cap part 34 blocking or closing the shaft part 32 on its second end and including a flat space 34a having an outer diameter larger than the root diameter of the female screw threading 35 in its interior. The tee nut 31 is different from the tee nut 11 or 21 in that the cap part 34 has neither an angular shape nor projections, but instead its plane shape is circular. Although the cap part 34 does not include means for positively preventing rotation of the tee nut 31 in a state embedded in a member of resin or rubber in this embodiment, advantages are still achieved because the shaft part 32 and the cap part 34 are continuously formed by an integral metal material and the tee nut 31 can thus be formed in high mass productivity by the manufacturing method described below. Thus, the tee nut 31 attains the aforementioned object of the present invention, and can be regarded as an embodiment included in the present invention.

Figure 3D:
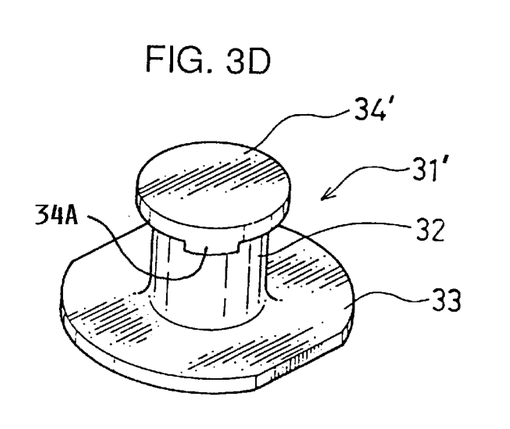
FIG. 3D is a perspective view showing a tee nut according to a modified example of the third embodiment of the present invention.

As shown in FIG. 3D, the axial thickness of the cap part 34' of the tee nut 31' according to a modified example of the third embodiment is changed in at least one portion or partial circumferential area in the vicinity of its outer periphery. For example, the cap part 34' has an irregular thicker portion 34A in the vicinity of the outer periphery of the cap part 34' as shown in FIG. 3D. Thereby the tee nut 31' which is embedded in the member of resin or rubber in the mode shown in FIG. 8B can be prevented from relative rotation with respect to the member, similarly to the tee nuts 11 and 21 according to the first and second embodiments. Such a change of the thickness of the cap part 34' in at least a portion in the vicinity of its outer periphery can be readily implemented by the following manufacturing method, with no reduction in the ease of mass production.

An embodiment of the method of manufacturing a tee nut according to the present invention is now described with reference to FIGS. 4 to 6.

The tee nut 11, 21, 31 or 31' according to the first, second or third embodiment of the present invention is manufactured as follows. Referring to FIG. 4, a long strip-shaped metal plate 55 consisting of an iron material, for example, is prepared. This metal plate 55 is intermittently progressed or moved by regular pitched steps along its longitudinal direction as shown by arrow 56, and subjected to desired working at each stop position.

In order to decide the position of each portion 57 for defining the flange part 13, 23 or 33, slits 58 are formed in the metal plate 55 around the portion 57. In order to retain the portion 57 held by the remaining portions of the metal plate 55 while the portion 57 is subjected to various subsequent working steps, the slits 58 are not provided along the overall periphery of the portion 57 but are so provided as to define deformable coupling portions extending between a plurality of locations around the portion 57 and the remaining portions of the metal plate 55.

Then, the metal plate 55 is so drawn that a central part of the portion 57 for defining the flange part 13, 23 or 33 is swollen out toward a lower major surface of the metal plate 55. This drawing is executed in a plurality of stages, for forming a swollen portion 59 as shown at work steps [a] for defining the shaft part 12, 22 or 32 in the final stage. Such a swollen portion 59 is formed by a part of the material of the portion 57 enclosed by or within the slits 58, whereby the space between the slits 58 is expanded.

Figure 4:
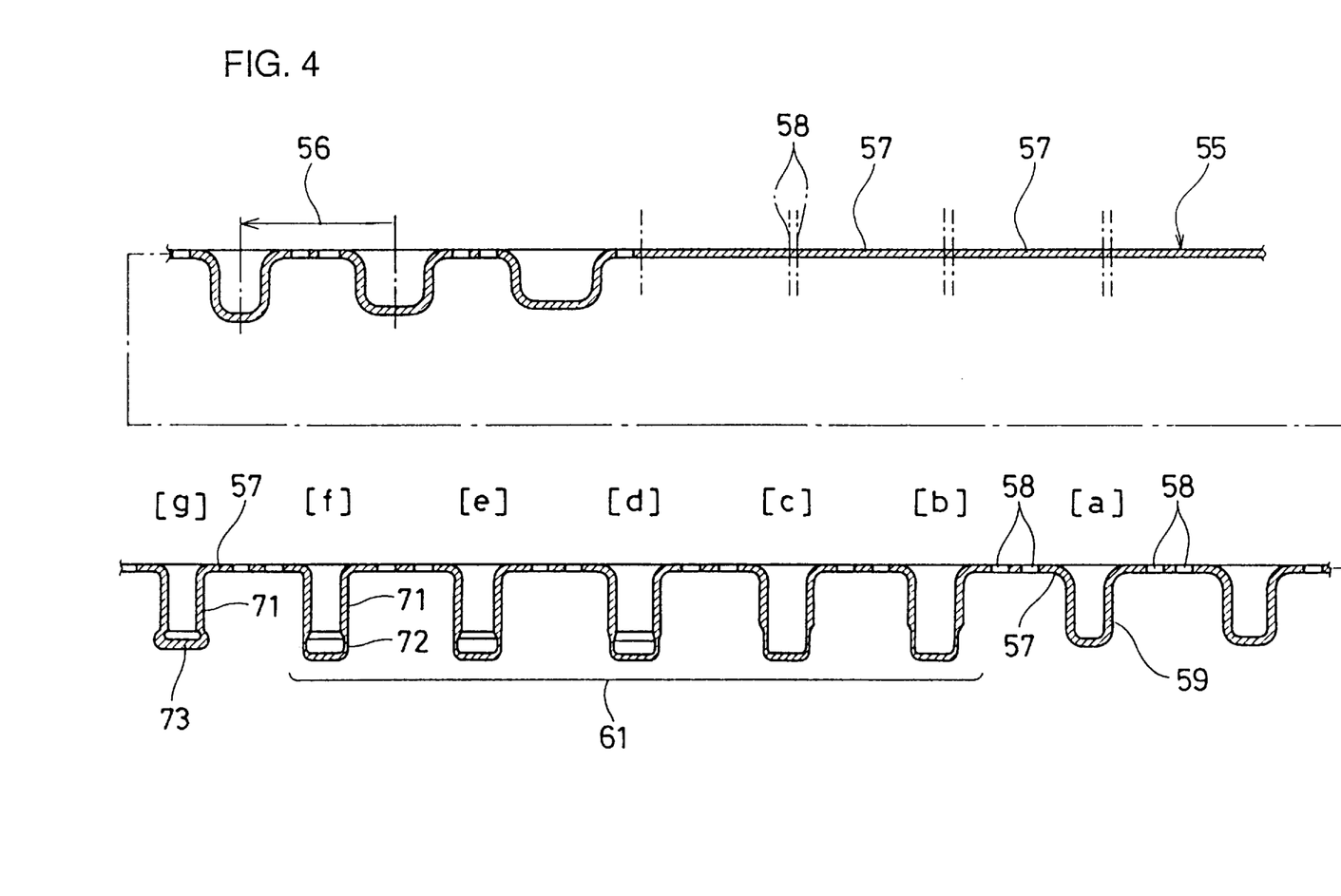
FIG. 4 is a sectional view showing states of working steps successively performed on a metal plate for obtaining the tee nut according to any of the first to third embodiments of the present invention.

In a work section 61 including work steps or stations [b] to [f] shown in FIG. 4 the swollen portion 59 is further deformed for forming a base portion 71 and, a portion 72 having a smaller thickness than the base portion 71. The thinner-walled portion 72 is formed in a part for defining the cap part 14, 24, 34 or 34' in the vicinity of the lower end of the swollen portion 59 while leaving its bottom or end portion intact. Thereafter the bottom surface of the swollen portion 59 is pressed upward for outwardly bending and extending the thinner-walled portion 72 and molding its outer periphery into an octagonal shape or a shape having projections, thereby forming a cap part 73.

Figure 5:
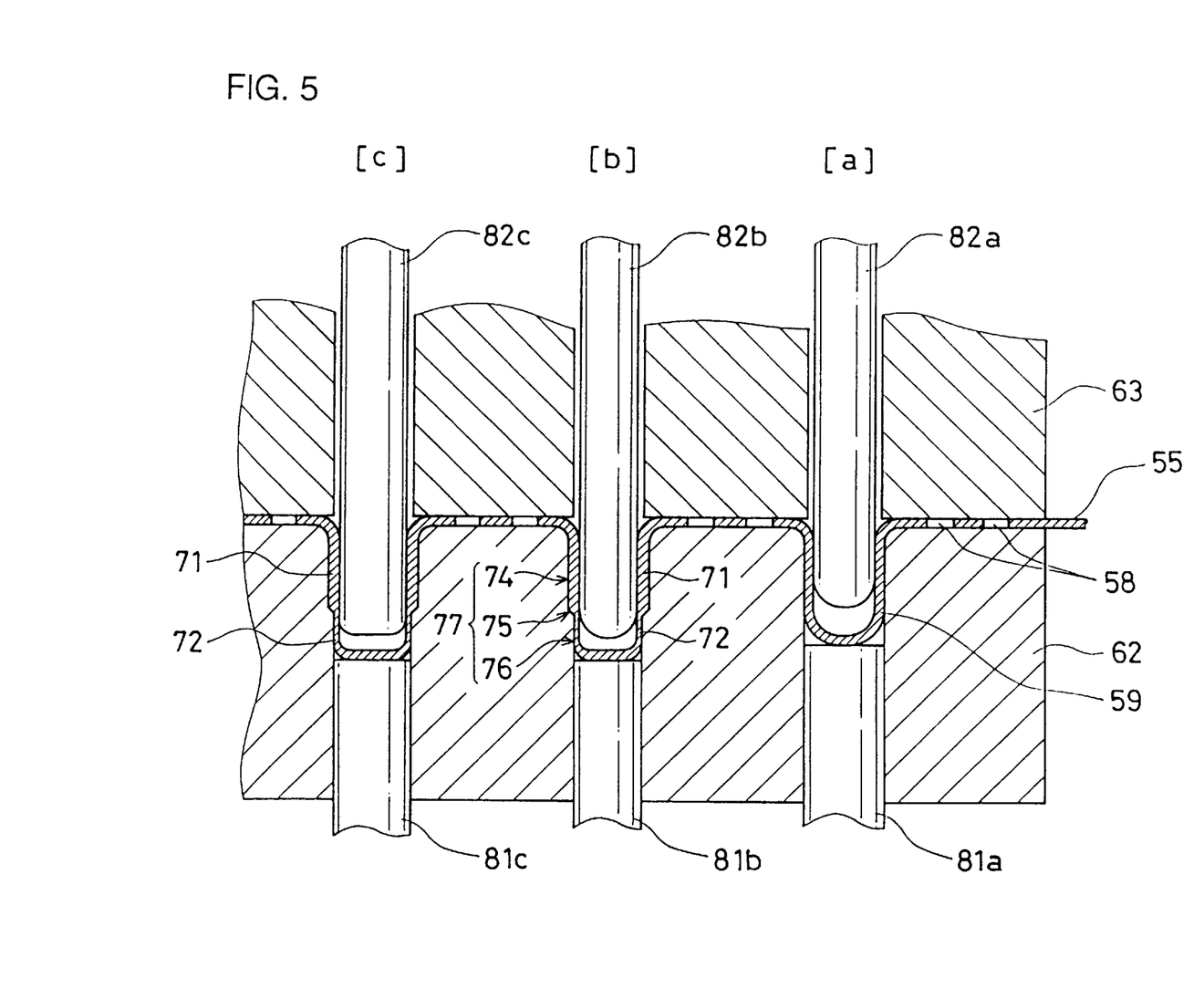
FIG. 5 is an enlarged sectional view showing in detail the working steps executed in work stations [a] to [c] in FIG. 4.
Figure 6:
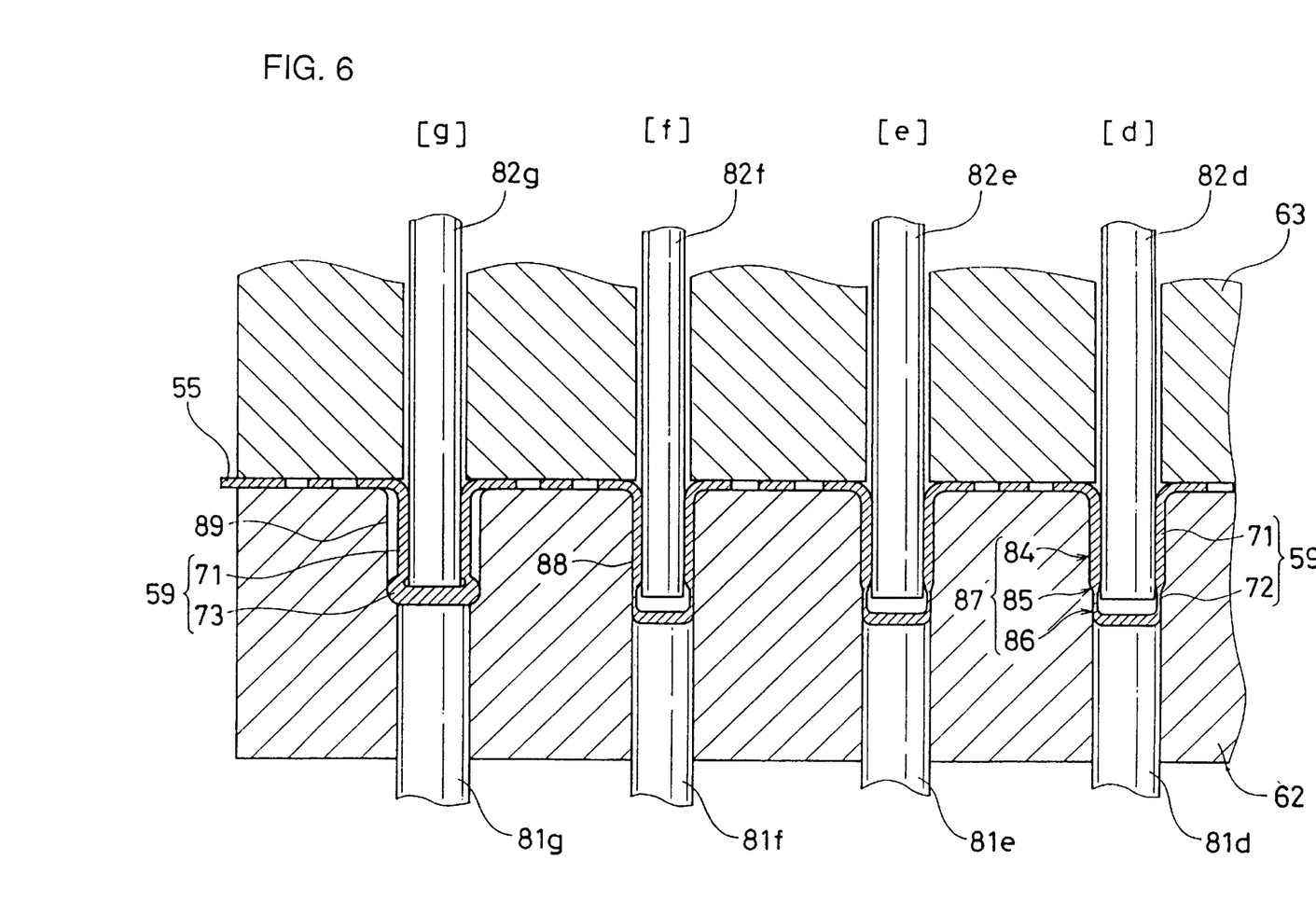
FIG. 6 is an enlarged sectional view showing in detail the working steps executed in work stations [d] to [g] in FIG. 4.

FIGS. 5 and 6 illustrate a series of steps from formation of the swollen portion 59 up to formation of the cap part 73 through the work section 61 in sectional structures including a molding die, a clamp die, punches and knockouts.

Referring to FIGS. 5 and 6, a molding die 62 and a clamp die 63 are arranged on lower and upper portions of the metal plate 55 respectively. The molding die 62 and the clamp die 63 are synchronously driven to approach to and separate from the metal plate 55. On the side of the molding die 62, knockouts 81a to 81g are held in relation to work stations [a] to [g] respectively. On the side of the clamp die 63, on the other hand, punches 82a to 82g are held in relation to the work stations [a] to [g] respectively.

In carrying out the working at each work station, the metal plate 55 is clamped between the molding die 62 and the clamp die 63 so that each of the knockouts 81a to 81g comes into contact with the lower end surface of the swollen portion 59 and each of the punches 82a to 82g is projected into the inner periphery of the swollen portion 59. Every time such operations of the molding die 62, the clamp die 63, each of the knockouts 81a to 81g and each of the punches 82a to 82g are attained and completed, the respective tools are retracted and then the metal plate 55 is successively intermittently fed as shown by arrow 56 (FIG. 4), so that the swollen portion 59 is successively subjected to desired working steps.

The swollen portion 59 is formed through the steps up to the work station [a] shown on the rightmost side of FIG. 5, while maintaining the thickness of the metal plate 55 substantially uniform. Thereafter the outer diameter of the forward end (lower end) portion 72 of the swollen portion 59 for defining the cap part 73 is relatively reduced as compared with that of the base portion 71 while maintaining the inner diameter of the overall length of the swollen portion 59 and the outer diameter and the thickness of the base portion 71 thereof unchanged in the work station [b] following the work station [a], thereby reducing the wall thickness of the thinner-walled forward end portion 72 as compared with the base portion 71. In more concrete terms, the molding die 62 is provided with a forging surface 77 consisting of a larger diameter part 74, an inclined part 75 and a smaller diameter part 76 for regulating or restricting enlargement of the base portion 71 by the larger diameter part 74 of the forging surface 77 and reducing the outer diameter of the forward end portion 72 by the inclined part 75 and the smaller diameter part 76 of the forging surface 77 while regulating or restricting reduction of the inner diameter along the overall length of the swollen portion 59 with the punch 82b, thereby reducing the thickness of the forward end portion 72.

The punch 82b employed in the work station [b] has a substantially semispherical forward end, to be smoothly driven for drawing the forward end portion 72 without damaging the surface of the metal plate 55. Thus, an end surface of the forward end portion 72 remains in a bent or somewhat rounded shape through the drawing in the work station [b]. In the next work station [c], therefore, the forward end portion 72 is molded to be substantially cylindrical with the punch 82c having a substantially cylindrical forward end while maintaining the thickness and the diameter of the base portion 71 unchanged.

In the work stations [b] and [c] of this embodiment, the step of reducing the thickness of the forward end portion 72 of the swollen portion 59 as compared with that of the base portion 71 is carried out by relatively reducing the outer diameter of the forward end portion 72 of the swollen portion 59 as compared with that of the base portion 71 while regulating or restricting reduction of the inner diameter along the overall length of the swollen portion 59. Alternatively, this step can be carried out by uniformly enlarging the inner diameter of the swollen portion 59 while regulating enlargement of the outer diameter of the forward end portion 72 of the swollen portion 59.

Then, the outer and inner diameters of the base portion 71 are reduced in three stages in the work stations [d] to [f] shown on the right side of FIG. 6 while maintaining the diameter of the forward end portion 72 unchanged, thereby obtaining such a shape that the outer diameter is substantially uniform along the overall length of the swollen portion 59 and while the forward end portion 72 has a smaller wall thickness than the base portion 71. In more concrete terms, the molding die 62 is provided with a forging surface 87 consisting of a larger diameter part 84 having a smaller inner diameter than the aforementioned larger diameter part 74, an inclined part 85 and a smaller diameter part 86 in the work station [d], for inwardly pressing the outer peripheral surface of the base portion 71 with the forging surface 87. The punch 82d prevents the base portion 71 from undergoing undesired inward deformation at this time.

Also in the work stations [e] and [f], forging surfaces of the molding die 62 inwardly press the outer peripheral surface of the base portion 71 while maintaining the diameter of the forward end portion 72 unchanged, so that the outer diameter of the base portion 71 is substantially equal to that of the forward end portion 72 after the semi-finished workpiece has passed through the work station [f]. In the work station [f], the molding die 62 is provided with a straight forging surface 88 for further inwardly pressing the outer peripheral surface of the base portion 71 with the forging surface 88, so that the swollen portion 59 has a substantially uniform outer diameter as a result. The punches 82e and 82f provided in the work stations [e] and [f] also serve functions similar to that of the punch 82d provided in the work station [d].

Then, the swollen portion 59 is inserted in a forging surface 89 of the molding die 62 having a cross-sectional shape identical to the intended plane shape of the cap part 73 to be formed in the work station [g]. In this work station [g], the knockout 81g presses the lower surface of the forward end portion 72 while the punch 82g prevents the inner surface of the swollen portion 59 from undergoing undesired deformation, whereby the thin-walled portion of the forward end portion 72 is outwardly bent and deformed and its outer periphery is molded into a desired non-circular shape, for forming the cap part 73.

In case of molding the tee nut 11 having the octagonal cap part 14 shown in FIG. 1, for example, the forging surface 89 of the molding die 62 provided in the work station [g] has an octagonal cross-sectional shape along the overall length of the depth direction. In case of molding the tee nut 21 having the cap part 24 provided with the projections 24b shown in FIG. 2, on the other hand, the forging surface 89 of the molding die 62 has a cylindrical inner periphery provided with longitudinal grooves in four portions along the overall length of the depth or axial direction.

Thereafter the portion 57 for defining the flange part 13, 23 or 33 is separated from the metal plate 55, although this step is not shown. An intermediate product for each tee nut formed in this manner is barrel-polished, in order to remove burrs resulting from the working steps. Then, a step of forming the female screw threading 15, 25 or 35 on the inner peripheral surface of the base portion 71 for defining the shaft part 12, 22 or 33 is carried out. Thus, the desired tee nut 11, 21, 31 or 31 ' is obtained.

According to the aforementioned manufacturing method, the cap part 14, 24, 34 or 34' of the tee nut 11, 21, 31 or 31' can be formed by plastic working rather than by cutting, whereby the necessary molding can be executed through a series of steps including plastic working for forming the swollen portion 59 for defining the shaft part 12, 22 or 32 in manufacturing of the tee nut 11, 21, 31 or 31'. Thus, neither spot welding nor caulking is required for connecting the tee nut body part with the cap part dissimilarly to the prior art, but rather an integral capped tee nut can be continuously and efficiently manufactured by drawing through a series of press working steps, whereby mass productivity can be remarkably improved.

Further, a long strip-shaped plate can be employed as the metal plate 55 for carrying out the steps while feeding the strip-shaped metal plate 55 along progressive dies, whereby the tee nut can be further efficiently manufactured without complicated steps of handing disconnected intermediate products.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tee nut comprising a shaft part, a flange part outwardly extending from a first end of said shaft part, and a cap part outwardly extending from a second end of said shaft part opposite said first end while blocking said second end, wherein all of said parts consist of an integral metal material, said shaft part comprises a hollow cylinder having a female screw threading on an inner peripheral surface thereof, said cap part comprises a substantially planar member that protrudes radially outwardly beyond an outer peripheral surface of said hollow cylinder, and said substantially planar member of said cap part has a first portion having a first axial thickness and a second portion having a second axial thickness different from said first axial thickness along an outer periphery of said substantially planar member.

2. The tee nut in accordance with claim 1, wherein said outer periphery of said substantially planar member of said cap part has a circular outer contour.

3. The tee nut in accordance with claim 1, wherein said second axial thickness is greater than said first axial thickness and said second portion comprises a projection protruding in an axial direction from said substantially planar member.

4. The tee nut in accordance with claim 1, wherein said cap part completely integrally closes said second end of said shaft part.

5. The tee nut in accordance with claim 1, wherein said substantially planar member of said cap part directly adjoins said hollow cylinder of said shaft part.

6. The tee nut in accordance with claim 4, wherein said female screw threading extends over substantially an entire axial length of said hollow cylinder.

7. A tee nut comprising a shaft part, a flange part outwardly extending from a first end of said shaft part, and a cap part closing and outwardly extending from a second end of said shaft part opposite said first end, wherein all of said parts are formed of an integral metal material with one another, said shaft part comprises a hollow cylinder, said cap part has a peripheral portion extending radially outwardly beyond an outer periphery of said hollow cylinder, and said peripheral portion has at least two regions having different axial thicknesses.

* * * * *

UNITED STATES PATENT AND TRADEMARK OFFICE
CERTIFICATE OF CORRECTION

PATENT NO. : 5,823,729

DATED : Oct. 20, 1998

INVENTOR(S) : Nagayama

It is certified that error appears in the above-identified patent and that said Letters Patent is hereby corrected as shown below:

On the Title Page, under [56] References Cited, U.S. PATENT DOCUMENTS,
   line 2, replace "3,019,856" by --3,019,865--.

Col. 4, line 45, after "female" insert --screw--;
   line 46, after "ing" delete "screw".

Col. 6, line 15, after "work" replace "steps" by --step--;
   line 22, after "and" delete ",".

Col. 10, line 4, after "claim" replace "4" by --5--.

Signed and Sealed this

Second Day of February, 1999

Attest:

Attesting Officer

*Acting Commissioner of Patents and Trademarks*